(12) United States Patent
Paessler et al.

(10) Patent No.: US 6,332,476 B1
(45) Date of Patent: Dec. 25, 2001

(54) PRESSURE LEVEL CONTROL DEVICE

(75) Inventors: Wolfgang Paessler, Ottersweiher; Bertram Bauer, Gaggenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,635

(22) PCT Filed: Oct. 26, 1999

(86) PCT No.: PCT/DE99/01554

§ 371 Date: Aug. 2, 2000

§ 102(e) Date: Aug. 2, 2000

(87) PCT Pub. No.: WO00/17723

PCT Pub. Date: Mar. 30, 2000

(30) Foreign Application Priority Data

Sep. 22, 1998 (DE) .............................................. 198 43 347

(51) Int. Cl.⁷ .................................................. F16K 15/14
(52) U.S. Cl. ............................................ 137/510; 137/554
(58) Field of Search .................................. 137/510, 554, 137/557, 895, 860

(56) References Cited

U.S. PATENT DOCUMENTS

| 4,140,436 | 2/1979 | Schumacher | 417/27 |
|---|---|---|---|
| 4,247,260 | 1/1981 | Schoenwald | 417/38 |
| 4,493,339 | * 1/1985 | Porter, Jr. | 137/510 |
| 4,754,732 | 7/1988 | Kuczenski | 123/196 S |
| 4,948,931 | 8/1990 | Nixon | 200/83 P |
| 5,144,102 | * 9/1992 | Buse | 200/83 Q |
| 5,620,024 | * 4/1997 | Yonezawa | 137/554 |

FOREIGN PATENT DOCUMENTS 43 42 587 A    6/1995   (DE) .

* cited by examiner

*Primary Examiner*—Stephen Hepperle
(74) *Attorney, Agent, or Firm*—Michael J. Striker

(57) ABSTRACT

A pressure level monitoring device includes a housing (10) and a switching unit (12) that is embodied on the housing (10) and protrudes into the inside of the housing. A first membrane (14) divides a first inner housing chamber (44), which can be acted on by pressurized fluid, from a second inner housing chamber (46). The housing is comprised of a top housing part (18) and a bottom housing part (50). A check valve (54) is connected to the first inner housing chamber (44) and is integrated into the bottom housing part (50).

9 Claims, 2 Drawing Sheets

PRESSURE LEVEL CONTROL DEVICE

PRIOR ART

The invention relates to a pressure level monitoring device.

Pressure level monitoring devices of this kind are usually used in the field of hydraulics or pneumatics in which there are used, for example, in control and switching units. In particular, in the automotive field, they are also used for monitoring tire pressure, in brake and injection systems, in door locking, and in seat adjustment.

The essential components of known pressure level monitoring devices are pressure switches which, together with check valves, permit the monitoring of pressure. The pressure switches are designed so that certain functions can be switched on as a function of pressure by means of positive or negative pressure on a membrane connected to a switching unit. The switching actuator moves in opposite directions depending on whether there is a positive or negative pressure and switches different electrical contacts.

Purely for the sake of pressure level monitoring, it is not necessary for there to be a switching as a function of positive and negative pressure, i.e. it is completely sufficient if only one electrical contact is switched. The use of conventional pressure switches consequently involves an unnecessarily high materials expense.

Furthermore, with conventional pressure switches, the check valves are not explicitly part of the switches, but are disposed separately on a component that is connected to the switches, for example a base plate or a control block.

Consequently, the utilization range of conventional pressure level monitoring devices is strictly limited because the desired function is only achieved together with an additional special component. Furthermore, a relatively high monetary and primarily materials-related expense is required, which additionally complicates the assembly of the switch used for pressure level monitoring.

SUMMARY OF THE INVENTION

The device according to the invention, has the advantage that conventional pressure switches, while at the same time reducing the number of components and therefore also reducing the number of assembly steps, are given an additional function which permits them to monitor and maintain a particular pressure level without depending on a special component. This is made possible through the integration of the check valve that communicates with the inner chamber of the housing into the bottom housing part.

Furthermore, the two-part embodiment of the housing with a top housing part and a bottom housing part results in a very compact design.

Advantageous updates and improvements of the device according to the invention, according to the main claim, are possible through the features embodied in the dependent claims.

The check valve integrated into the bottom housing part has a second membrane with a central opening and a securing means that fixes the second membrane. It is also respectively connected to at least one inlet fitting and one outlet fitting. This results in the fact that the pressure switch used for a particular task can be used universally and can be used for pressure level monitoring in other technical fields as well.

If the second membrane is secured along its edge region by the securing means against a shoulder inside the bottom housing part, then it is fixed with regard to its position in the bottom housing part and its position there cannot change, even under the influence of pressure. Moreover, if it is comprised of an elastic material, then only its central region will be deformed under the influence of pressure. When it is not deformed, the central region of this second membrane rests against a sealing surface which is formed onto a sealing seat embodied on the inside of the bottom housing part.

In order for this valve device to be able to function as a check valve, the second membrane divides the inner chamber of the housing, which can be acted on by a pressurized fluid, into three different subchambers. This results in an extremely compact design which permits the check valve function and the monitoring function to be provided in a compact space adjacent to each other and using the same components.

The first subchamber is essentially defined by the first membrane and the second membrane, the second subchamber is essentially defined by an outer wall containing the inlet fitting and the outer surface of the sealing seat together with the second membrane, and the third subchamber is essentially defined by the inner surface of the sealing seat together with the second membrane.

This prevents overpressure from escaping into the second subchamber from the first and third subchambers. At the same time, however, overpressure is prevented from escaping into the first and third subchambers from the second subchamber. The classic check function is therefore produced.

DRAWING

An exemplary embodiment of a device according to the invention is shown in the drawings and will be explained in detail in the subsequent description.

DESCRIPTION OF THE PREFERRED EMBODIMENT

Figure 1:
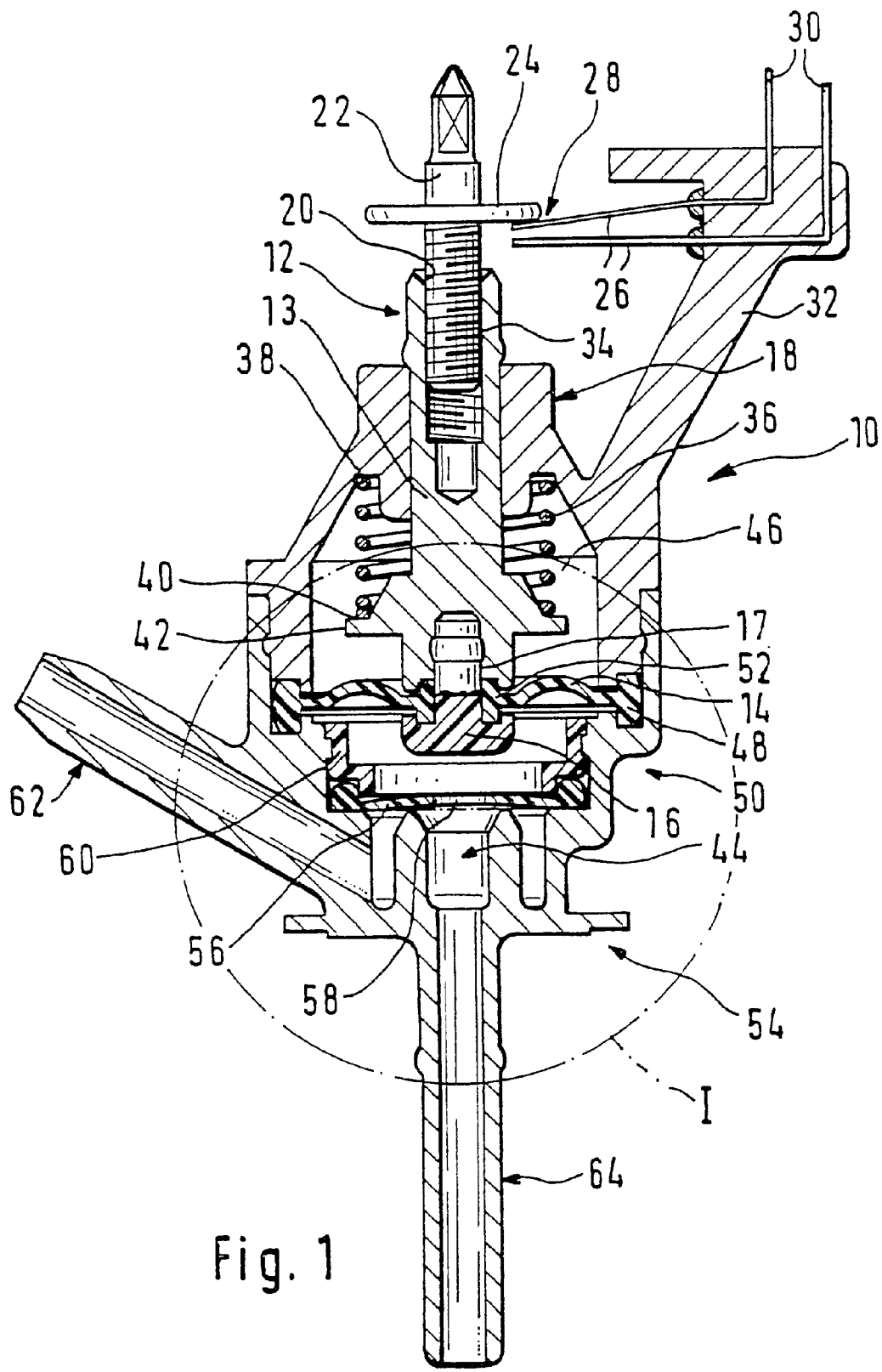
FIG. 1 shows a section through the exemplary embodiment.

The exemplary embodiment of a pressure level ring device according to the invention shown in FIG. 1 is comprised of a housing 10 and a switching unit 12 that is embodied on the housing 10, protrudes into the interior of the housing 10, and is connected to a first membrane 14 on its end disposed inside the housing. The connection of the first membrane 14 to the bolt 13 is produced by means of a stopper 16, which protrudes into a bore 17 at the corresponding end of the bolt 13 and is locked there in detent fashion. On the end of the bolt 13 protruding out of a top housing part 18, an actuator 22 is screwed into another bore 20. With a collar 24 which runs around the actuator 22, two contact plates 26 disposed spaced one above the other can be moved by means of axially moving the bolt 13 and consequently also the actuator 22. The two contact plates 26 can therefore be pressed against each other and produce an electrical contact at the ends 28 oriented toward the actuator 22. The two other ends 30 of the contact plates 26 serve as electrical connections for electric machines to be switched, for example pumps. The contact plates 26 are connected to a contact carrier 32 which is of one piece with the top housing part 18.

The bolt 13 is guided so that it can move axially in a central opening 34 of the top housing part 18, wherein its movement out of the housing 10 takes place counter to the force of a spring 36. The spring 36 rests with its one end against a surface 38 on the inside of the top housing part 18 and rests with its other end against a surface 40 of a collar 42 that runs around the bolt 13.

The first membrane 14 divides the entire inner chamber of the housing into a first inner housing chamber 44 that can be acted on by a pressurized fluid and is separated for this purpose from a pressure-free second inner housing chamber 46 and, with its outer edge 48, this first membrane 14 is clamped between the top housing part 18 and a bottom housing part 50. A central region 52 of the first membrane 14 is secured by the stopper 16.

A check valve 54 is integrated into the bottom housing part 50 and is comprised of a second membrane 56 with a central opening 58 and a securing means 60 that fixes the second membrane 56, and is connected to at least one inlet fitting 62 and one outlet fitting 64.

Figure 2:
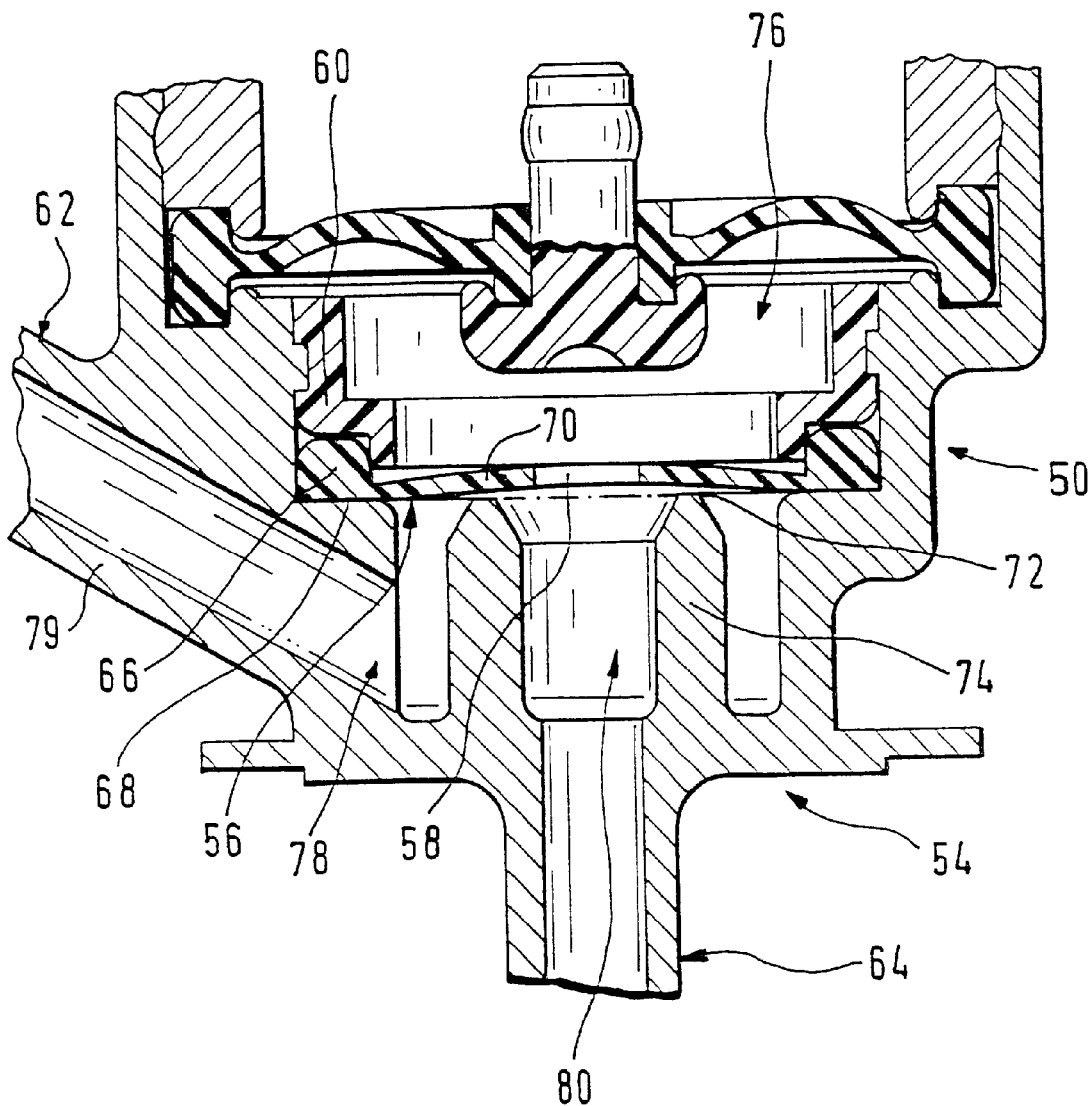
FIG. 2 shows an enlarged depiction of the region I in FIG. 1.

FIG. 2 shows an enlarged depiction of the region I in FIG. 1, wherein the same parts have the same reference numerals. For the sake of clarity, the reference numerals above 64 are only used in FIG. 2 and reference will be made below to FIG. 2.

Along its edge region 66, the second membrane 56 is secured against a shoulder 68 on the inside of the bottom housing part 50 by the securing means 60 that is supported on the bottom housing part 50 to which it is locked in detent fashion. When it is not deformed, the second membrane 56 rests with its central region 70 against a sealing surface 72, which is formed onto a sealing seat 74 embodied on the inside of the bottom housing part 50.

The second membrane 56 is disposed so that it divides the first inner housing chamber 44, which can be acted on with pressurized fluid, into three different subchambers 76, 78, 80.

The first subchamber 76 is essentially defined by the first membrane 14 and the second membrane 56, the second subchamber 78 is essentially defined by the inner surfaces of a wall 79 containing the inlet fitting 62 and the outer surface of the sealing seat 74, and the third subchamber 80 is essentially defined by the inner surface of the sealing seat 74 which transitions into the outlet fitting 64.

The function of the pressure level monitoring device according to the invention, with the check valve integrated into the bottom housing part 50, in conjunction with the two FIGS. 1 and 2, is explained as follows: when the second subchamber 78 is acted on with pressure by means of the inlet fitting 62, then the central region 70 of the second membrane 56 lifts up, which produces a connection to the third subchamber 80. In addition, the central opening 58 of the second membrane 56 produces a connection to the first subchamber 76. Consequently, a largely uniform pressure can build up in the three subchambers 76, 78, 80, which continuously increases to a value $p_1$ when the pump is switched on. This value $p_1$ is essentially determined by the spring 36 and the elasticity of the first membrane 14, which is deformed due to the increasing pressure and thus moves the bolt 13, together with the actuator 22, in the axial direction out of the housing 10 counter to the force of the spring 36. As a result, when the pressure value $p_1$ is achieved, the electrical contact is broken between the contact plates 26.

If the pump which is used to build up the pressure in the three subchambers 76, 78, 80 is connected to the ends 30 of the contact plates 26, then this pump is switched off and a further pressure increase with $P > p_1$ is prevented.

When the pump is switched off, the second subchamber 78 is ventilated or switched so that it is pressure-free and the central region 70 of the prestressed second membrane 56 comes to rest spontaneously against the sealing seat 72. As a result, the connection is closed off between the second subchamber 78 and the third subchamber 80 approximately in the vicinity of the pressure value $p_1$, wherein the electrical contact is still broken. A further pressure drop with $p < p_1$ is thus prevented in the two subchambers 76 and 80 via the second subchamber 78, because the classic function of a check valve comes into play. Consequently in the ideal case, a pressure $p_1$ that is relatively constant over time is set in the first subchamber 76 and in the third subchamber 80 and is independent of the ventilation-induced pressure drop to normal pressure in the second subchamber 78.

In contrast to the ideal case, if the pressure in the first subchamber 76 and the third subchamber 80 connected to it drops to a value $p < p_1$ due to leaks or also due to connected consumers, then this is also accompanied by a lowering of the actuator 22. This actuator 22 can be adjusted so that when a particular pressure value $p_2 < p_1$ is reached, the electrical contacts of the contact plates 26 can be closed again. The pump begins again to act on the second subchamber 78 with pressure and the above-described mechanism starts from the beginning. In this manner, the pressure level in a consumer connected to the outlet fitting 64 can monitored and be kept constant in a predeterminable pressure interval $p_1 > p > p_2$.

As a rule, the dynamics and hystereses in the system assure that $p_1$ is greater than $p_2$ and the contact plates 26 do not close again and consequently switch on the pump 22 before the second membrane 56 drops onto the sealing seat 72. Namely, this would lead to an undesirable cyclical behavior and unacceptable regulating behavior. However, it can also be useful for pressure elevations to be permitted by means of deliberate, electronically controlled lag times of the pump, which pressure elevations increase the pressure interval $p_1 > p > p_2$ and assure that the contract plates 26 are opened to a corresponding degree. This measure completely prevents the undesirable cyclical behavior.

What is claimed is:

1. A pressure level monitoring device comprising a housing (10); a switching unit (12) which is embodied on the housing (10) and protrudes into the inside of the housing; a first membrane (14) that divides a first inner housing chamber (44), which can be acted on by pressurized fluid, from a second inner housing chamber (46), the housing including a top housing part (18) and a bottom housing part (50); and a check valve (54) connected to the first inner housing chamber (44) and having a second membrane (56) with a central opening (58), and a securing means (60) for fixing the second membrane, the check valve being integrated into the bottom housing part (50).

2. The device according to claim 1, wherein the check valve (54) is connected to at least one inlet fitting (62) and to at least one outlet fitting (64).

3. The device according to claim 2, wherein the second membrane (56) along an edge thereof (66) is secured by the securing means (60) against a shoulder (68) on the inside of the bottom housing part (50).

4. The device according to claim 2, wherein a central region (70) of the second membrane (56), when the second membrane is not deformed rests against a sealing surface (72) which is formed onto a sealing seat (74) embodied on the inside of the bottom housing part (50).

5. The device according to claim 4, wherein the second membrane (56) divides the first inner chamber (44) of the housing into a first subchamber (76), a second subchamber (78), and a third subchamber (80).

6. The device according to claim 5, wherein in the first subchamber (76) is defined by the first membrane (14) and the second membrane (56).

7. The device according to claim 5, wherein the second subchamber (78) is defined by an outer wall (79), which contains the inlet fitting (62), and the outer surface of the sealing seat (74).

8. The device according to claim 5, wherein the third subchamber (80) is defined by the inner surface of the sealing seat (74) and transitions into the outlet fitting (64).

9. The device according to claim 5, wherein the third subchamber (80) continuously communicates with the first subchamber (76) via the central opening (58) of the second membrane (56) and only communicates with the second subchamber (78) when the second membrane (56) is lifted up from the sealing surface (72) of the sealing seat (74).

* * * * *